United States Patent Office 3,623,366
Patented Nov. 30, 1971

3,623,366
PRESSURE RESPONSIVE SWITCHES AND
SYSTEMS PERTAINING THERETO
William G. Rowell, Canton, Mass., assignor to Former
Electric Products Co., Inc., Natick, Mass.
Continuation-in-part of application Ser. No. 819,149,
Apr. 25, 1969. This application Apr. 8, 1970, Ser.
No. 26,650
Int. Cl. G01f 23/18
U.S. Cl. 73—301
28 Claims

ABSTRACT OF THE DISCLOSURE

A pressure sensitive switch, contained within a pressure transmitting envelope, has a metallic supporting strip carrying a fixed contact, and a movable contact carried by a parallel flexible metallic strip spaced at its ends from the supporting strip by insulating pads so that the contacts are in close promixity. One end of the flexible strip is fixedly secured in cantilever fashion, while the other end is free to move except as restricted by its spacer. In one particularly useful utilization, levels of liquid or other fluent material are detected and indicated by means of a number of similar pressure-actuated switches disposed at different heights in the fluent material. The switches have a common metallic supporting strip and each switch includes a fixed contact carried by the supporting strip. In another particularly useful utilization, levels of liquid and other fluent material are detected and indicated by means of a number of pressure actuated switches disposed substantially at a common height in the fluid material. The switches have flexible strips of different resiliencies or with different contact gap widths so that closure of switches' contacts will take place at different fluid pressures corresponding to different levels. In both described utilizations, each of the switches is connected to remote level or pressure calibrated indicator means. Indicator lamps connected to a power source by means of the switches can be used for that purpose, or a resistance network whose resistance value changes with the closure of the switches to vary the current through an ammeter.

CROSS-REFERENCE TO RELATED APPLICATIONS

This is a continuation-in-part of application Ser. No. 819,149, filed Apr. 25, 1969, and abandoned upon the filing of this application.

BACKGROUND OF THE INVENTION

Field of the invention

The invention relates to pressure-actuated switches and to systems incorporating such switches for measuring and indicating pressure differentials such as correspond to different levels of fluent material.

Description of the prior art

Pressure responsive switches have heretofore been proposed for measuring the level of liquid or other material in receptacles, and particularly to measurements carried out remotely, due to a hostile environment in or near the tank or due to an inaccessible location of the tank. Techniques for detecting and indicating such levels are known. In the U.S. patent to Colgan 3,342,731, the hydrostatic head provided by the liquid moves a diaphragm which in turn changes the amount of contact between a conductor and a resistive material, varying the net resistance in a circuit through the conductor and resistive material. An ammeter is used to indicate changes in resistance.

In the U.S. patents to Stone 3,350,940, Pierce 3,153,342, Detuno 2,541,576, Adersen 2,713,793, and in the British Pat. 716,958, a sensor strip is disposed vertically in the tank. The sensor comprises parallel resistive and conductive elements which are brought into contact by the pressure of the liquid to change the net resistance of a circuit through the elements. Typical resistance measuring devices, such as Wheatstone bridges or meters, are used to indicate the change in resistance and thus the change in level of liquid.

All of the above pressure responsive systems rely upon a variable resistance and are unsatisfactory from the standpoints of both difficulty of manufacture and reliability of performance. Manufacture is difficult because one element must have a uniform resistance per unit length, which can be obtained only at some expense. Performance is poor because contact between the conductor and the resistive material is uncertain, and the resistance of the elements may vary depending on surface effects at the contact, as well as on the problems posed by varying pressures of contact due to agitation of the medium whose pressure is to be detected or measured. Further drawbacks of variable resistance measurement devices are the need for calibrating the indicating means, changes in characteristics of the resistive material with age, and susceptability of the system to malfunctioning if the sensor strip containing the elements is twisted or bent during use.

Alternatively to variable resistance measurement devices, there have been proposed pressure responsive systems situating a series of conventional on-off switches at different heights and having their contacts closed by fluid pressure exerted through a diaphragm or membrance. French Pats. 752,158 and 825,007 are examples of such systems. Two major drawbacks of these systems can be traced to the switches used. They often are mechanically complicated, and require a complicated mounting apparatus to accommodate pins, springs, gaskets, and the like. Also, they are often subject to damage, for switches adapted to respond at low pressures for sensitivity are also subject to high pressures, and diaphragm rupture and plastic deformation of delicate spring elements are recurring problems.

SUMMARY OF THE INVENTION

Objects of the present invention are to provide on-off pressure responsive switches, and detecting systems served by such switches such as level sensing and indicating apparatus, capable of simple, accurate and reliable operation, which are inexpensive in manufacture and assembly, and which can be used safely in hazardous environments.

According to the invention, pressure actuated switches comprise a fixed contact carried by a supporting strip, and a movable contact carried by a flexible strip having its ends spaced from the supporting strip by spacing means, with the contacts in close proximity. The flexible strip in fixedly secured at one end, and the other end is free to slide against the spacing means. Pressure transmitted to the flexible strip through a surrounding envelope causes the contacts to close for remote indication of pressure such as proportionate to a liquid level.

One level detecting means according to the invention comprises a supporting strip disposed in fluent material with one end higher than the other, vertically or diagonally. Distributed along the supporting strip at predetermined levels is a number of pressure-actuated switches, and surrounding the supporting strip and switches is a pliable envelope for transmitting the pressure of the fluent material to the switches. Conductive means connected to the switches lead to remote responsive means which indicate whether a switch is closed or open and thereby disclose the level of fluent material in the tank.

By changing the flexibility of the flexible strip, the contact gap, or other pressure-responsive parameters, the pressures at which the switch contacts will close can be changed. Using this principle, another level detecting means according to the invention comprises a plurality of pressure actuated switches of the type described, disposed at a common level in a tank of fluent material, said switches having their flexible strips responding to close the switches' contacts at different selected pressures corresponding to different selected levels of the fluent material. Conductive means connected to the switches lead to responsive means which indicate whether a switch is closed or open and thereby disclose the level of fluent material in the tank.

Other novel features and aspects of the invention will be apparent from the following description of preferred embodiments.

DESCRIPTION OF THE PREFERRED EMBODIMENTS

Figures 1, 2, 3, 4, 4A, 8, 9:
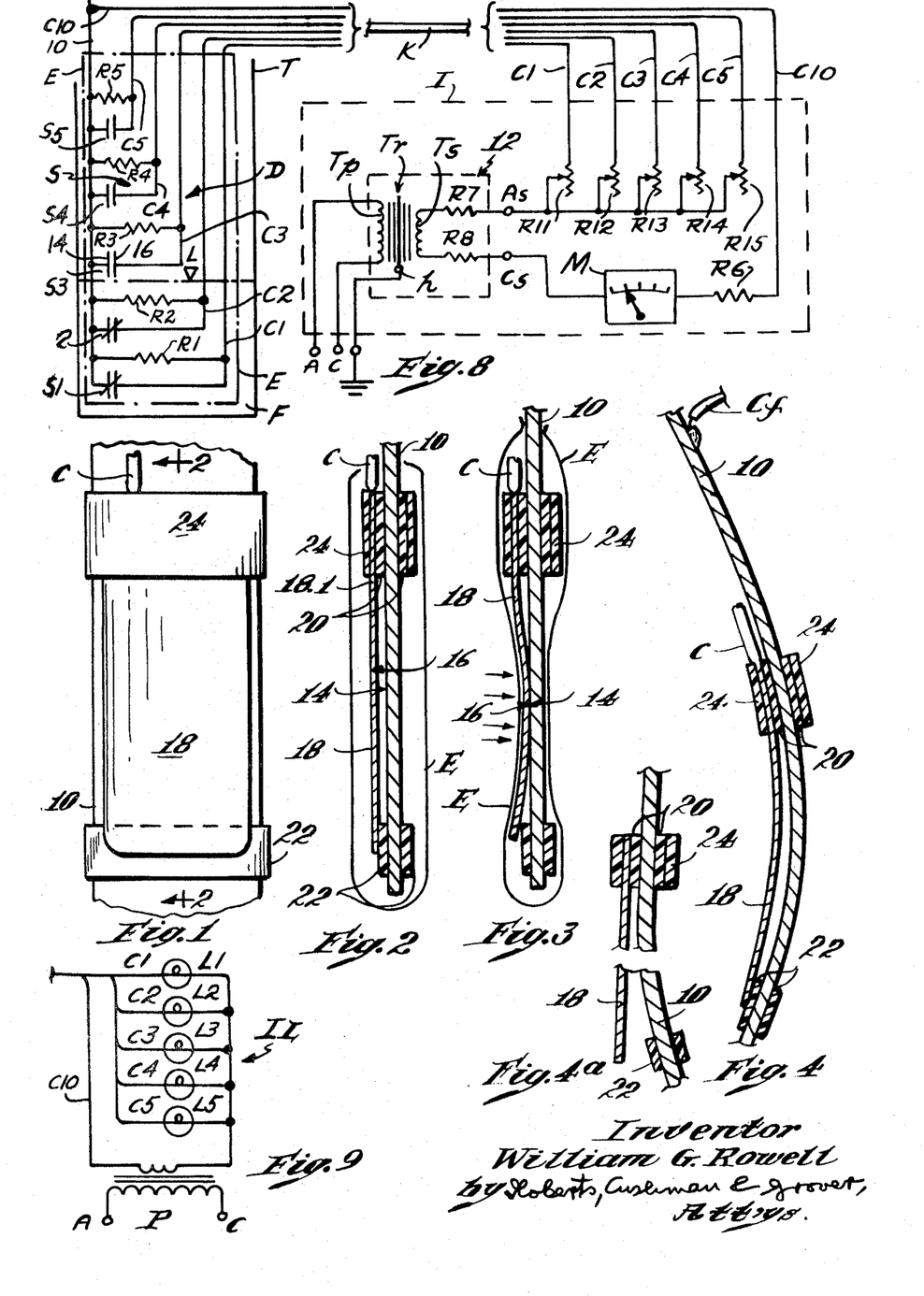
FIG. 1 is an elevation of a pressure actuated switch according to the invention.
FIG. 2 is a section on line 2—2 of FIG. 1.
FIG. 3 is a section similar to FIG. 2, showing the switch closed.
FIGS. 4 and 4a are sections similar to FIG. 2 showing the behavior of the switch under bending stresses.
FIG. 8 is an essentially schematic view of level detecting and indicating means according to the invention.
FIGS. 9, 10 and 11 are schematic views of other indicating means, analogous to that of FIG. 8.
Figure 7:
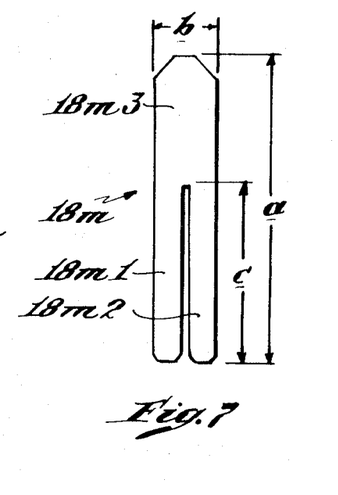
FIG. 7 is a detail elevation of a switch blade.

The efficacy and accuracy of pressure detecting systems according to the invention is dependent to a large extent on the pressure actuated switches employed in the system. These switches must be both inexpensive and reliable, must be designed to close either with slight pressures or precisely at specified pressures to give an accurate indication of level, and must be free from malfunctions caused by twisting or bending. A pressure actuated switch with these characteristics is illustrated in FIGS. 1 and 7. A supporting strip 10 is conductive and one surface thereof forms a fixed contact 14. The movable contact 16 is formed by the surface of a flexible metallic strip 18 which is spaced by flat insulating pads 20 and 22 from the supporting strip 10 with the fixed and movable contacts 14 and 16 in close proximity. One end 18.1 of the flexible strip 18 is held secured to the spacer 20 by band or similar means 24 while the other end of the flexible strip 18 is free to slide along spacer 22 or to lift therefrom. An insulated conductor wire C is electrically connected to the fixed end 18.1 of flexible strip 18, as by soldering. In one highly practical embodiment of the invention the spacers 20 and 22 are formed by wrapping one or more layers of pressure sensitive tape (for example Scotch glass fiber reinforced adhesive tape) around the conductive supporting strip 10, and the securing means 24 comprises an additional layer or layers of pressure sensitive tape wound over the flexible strip 18 and over the layers forming the spacer 20.

The switch S by itself or, when used in systems to be described below, together with other switches mounted on supporting strip 10, is encased within a surrounding envelope E (shown schematically in FIGS. 2 and 3) which is made from a pliable inert insulating material, for example, Teflon (polytetrafluoroethylene). Teflon tubing of 1⅜" width and 0.005" thick was found to be satisfactory. The envelope E serves a dual purpose: it insulates the strip 10 and the switch or switches both electrically and chemically from the fluent material wherein they are immersed and it permits the pressure of the fluent material to be transmitted to the flexible strip 18 to cause it to flex to bring the movable contact 16 into contact with the fixed contact 14, as shown in FIG. 3.

The switch construction described herein has a number of advantages. Since the flexible strip 18 presents a large surface area to the fluent material, relatively low pressures are adequate to cause the switch to close. Without great difficulty switches can be made to actuate as low pressures of approximately 1½" to 2" of water. Very accurate indications of level can be given simply by placing a plurality of these low pressure actuated switches at different depths, at the respective levels they are designed to indicate, as will be described below. Indications of level can also be given by placing a plurality of modified switches at a single depth, the switches modified by reducing the flexibility of strip 18, as by adding a stiffening strip, so that they will close at pressures corresponding to the levels they are to indicate, as will be described below with reference to FIGS. 12–13. Similarly, very accurate indications of pressure variation such as in closed tanks can be given by one or more switches according to the invention, as will also be explained. The contact made by the switch is very reliable since as FIG. 3 shows, increasing pressures cause increasing areas of contact and the contact is, moreover, a rolling and wiping contact. Hence, even if the fixed and movable contact surfaces 14 and 16 were to become dirty, the switch would not malfunction but simply require a little greater depth of immersion or pressure increase within a tank, before effective contact takes place. Another important feature of the switch is its ability to withstand bending without malfunctioning. Because the flexible strip 18 is secured only at one end cantilever fashion, and is free to slide at the other end, no false contact will result when the supporting strip 10 is bent either in the direction of the flexible strip 18, FIG. 4, or in the opposite direction as shown in FIG. 4a. It is true that such bending will vary the pressure at which the switch closes, but this is a decidedly less serious abberation than would be the false indication of a closed switch.

Figures 5, 6:
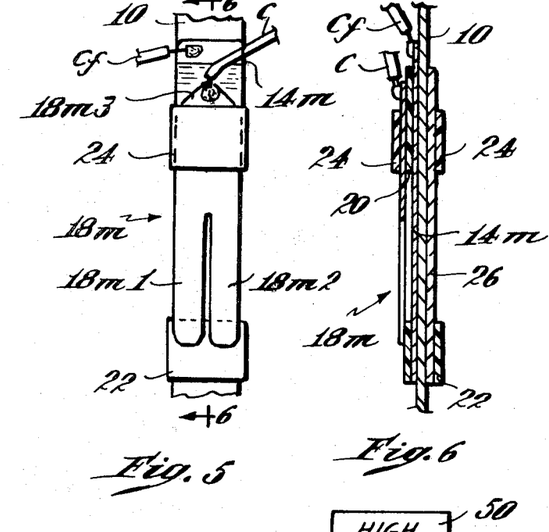
FIG. 5 is an elevation similar to FIG. 1 showing another embodiment of the pressure actuated switch according to the invention.
FIG. 6 is a section on line 6—6 of FIG. 5.

FIGS. 5 and 6 illustrate a modified, and preferred for low pressure actuation, form of pressure actuated switch according to the invention. In this embodiment the flexible strip 18m is bifurcated (FIGS. 5 and 7) having independently actuatable portions 18m1 and 18m2 connected by a common portion 18m3 which it attached to conductor C. The purpose of providing bifurcated contacts is to increase contact reliability by minimizing trouble due to dirt. The probability of simultaneous failure of both contact portions 18m1 and 18m2 is less by several orders of magnitude than the probability of single contact failure. Also in this embodiment, the fixed contact on the supporting strip 10 is a separate strip or sheet 14m of special contact material rather than a surface of the strip 10 proper. Preferably, the fixed contact strip 14m is gold-plated silver, with the flexible strip 18m, 18m1 and 18m2 likewise of gold-plated silver. The two gold surfaces face one another for optimum electrical contact. This embodiment also comprises a stiffening strip 26 affixed to supporting strip 10 by means of the above-described pressure sensitive tape used to form pads or spacers 20 and 22, and securing means 24. The flexible contact strip 18m is similarly secured to the supporting strip 10 and the contact strip 14m by such tape means, indicated at 24. Instead of being located on the side of the supporting strip 10 opposite the flexible strip 18m, the stiffening strip 26 can be located on the same side, between the supporting strip 10 and the fixed contact strip 14m. It will be appreciated that individual conductive contact strips, such as 14m, can be applied to a supporting strip 10 made from electrically non-conductive material, and that conductors leading to respective individual indicating means can then be fastened to these contact strips 14m as shown at Cf.

Figure 10:
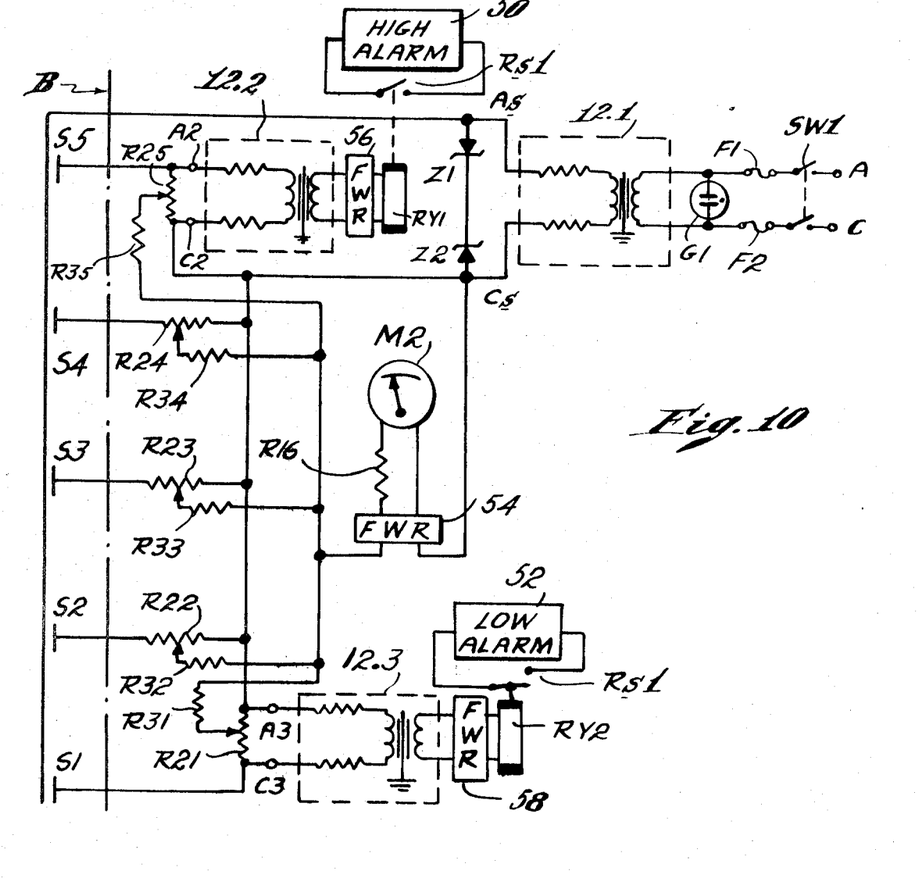

In an embodiment which works satisfactorily for purposes of installations according to FIGS. 8, 9 and 10, the supporting strip 10 and the stiffening strip 26 are made of fully hardened stainless steel, 5/8" wide by 0.25" thick. As mentioned above, the flexible contact strip 18m and the fixed contact strip 14m are made of gold-plated silver; suitable dimensions are ½" wide by .004" thick. The corresponding dimensions of the split flexible strip according to FIG. 7 are as follows; $a=2½"$, $b=½"$, $c=1¼"$. A gap distance between normally open strips 14m and 18m of approximately .018" (as determined by the spacer 20) was found to be satisfactory. A pressure of about 15 grams at the center of the contact fingers will cause the flexible strip 18 to bridge the 0.018" span to provide secure closing of the circuit.

Fabrication of the switches according to the embodiment of FIGS. 1 to 4 or the embodiment of FIGS. 5 to 7 is relatively simple. The pressure sensitive tape used to form spacers 20 and 22 is simply wrapped over the supporting strip 10 (FIGS. 1 and 4), or over the contact strip 14m and stiffening strip 26 (FIGS. 5 to 7) at the appropriate locations. The conductor C is soldered to one end of the flexible strip 18 or 18m and this end is secured to the supporting strip 10 with the pressure sensitive tape. The conductor C is preferably led along the supporting strip 10 and can be fastened thereto if desired with additional wrappings of tape. The structure comprising a supporting strip 10 and one or more switches is then inserted into the pliable envelope E, and this detector is then ready to be inserted into the supervised apparatus such as a tank, the top end of the supporting strip 10 being fastened in any convenient fashion and the wires C and Cf brought out in appropriate fashion.

In a preferred especially useful embodiment of the invention, the information provided by pressure switches as above described is utilized for liquid level detection in the following manner:

In FIG. 8 a tank T is schematically shown, containing fluent material F at varying levels to be detected, one such level being indicated by way of example at L. The fluent material F is typically a liquid, but may also be a slurry, a loose granular material, or another arrangement of matter having an upper interface to define level and capable of exerting a pressure in a fairly uniform manner as does a liquid. As will become apparent hereafter, the material need not establish a linear or regular pressure gradient with height.

The level L is detected by sensing or detecting means D, such as described above with reference to FIGS. 1 to 7, inserted in the tank T as shown schematically in FIG. 8. The detecting means D comprises the supporting comprises the supporting metallic strip 10 within envelope E extending vertically within the tank T where it can be contacted by the fluent material F. A plurality of pressure actuated switches S, here five in number and indexed as S1, S2, S3, S4, and S5, are carried by the supporting strip 10 and distributed therealong at predetermined heights. Typically the switches will actuate at low pressure and will be disposed to indicate various significant levels as: empty, ¼ full, ½ full, ¾ full, and full. Switches S1 through S5 are intended in FIG. 1 to represent these levels. The lower end of the detector D may have affixed thereto a weight, a magnet or other anchoring or securing means, or it may hang free. Only one opening in the top of the tank is needed to accommodate the detector D and that opening may be sealed if needed. In some instances, such as in light powdered materials, in silos for example, the assembly D (FIG. 8) can be advantageously placed in a channel member extending angularly within the container. Also, due to the longitudinal flexing of the supporting strip, the assembly within envelope E can go around bends of tubing or follow the contour of a container. If the material being monitored contains possibly damaging objects, such as floating bodies, the sensor strip assembly can be inserted into a sieve-like pipe or conduit, for protection.

Referring also to FIGS. 1 to 7, each switch S has associated therewith a conductor C (indexed in FIG. 8 as C1, C2, C3, C4 and C5 to correspond to the switch indexing) which leads exteriorly of the tank T to an indicating means I designed to reveal remotely which of the switches are open or closed and thereby to indicate the prevailing level L of fluent material respectively actuating the flexible contact 18 or 18m of a respective switch S. As shown in FIG. 8, the conductors C1 through C5 lead to respective flexible contact 18 of the switches, whereas the fixed contacts 14 for each switch are connected to the supporting strip 10 which acts as a common terminal Cf. A conductor C10 leads from the common terminal at supporting strip 10 and together with conductors C1 to C5 is gathered in a common cable K leading to the indicating means I where the conductors are separated again into separate components within the indicating means. All of these conductors are of course electrically insulated from one another.

The indicating means I illustrated in FIG. 8 is designed to be especially useful where hazardous or hostile environments are encountered. A standard source of alternating current line power is supplied to terminals A, C, of the primary winding Tp of a step down transformer Tr having a secondary winding Ts and a grounded conductive shield h disposed between the windings. In series with the secondary Ts are resistors R7 and R8 of 25 ohms each. The transformer and resistors R7 and R8 are placed in a block 12 where they are isolated with potting material, the resulting package acting as a low voltage AC power supply at output terminals As, Cs. In series with each of the switches S1 through S5 and conductors C1 through C5 are potentiometers R11 through R15 variable from 0 to 10K ohms. The conductor C10 is connected in series with the resistor R6 of 270 ohms, an AC milliammeter M scaled from 0 to 100 milliamperes, the power supply across terminals As, Cs, and the parallel resistors R11 through R15. The potentiometers R11 through R15 are calibrated so that successive closings of the switches S1 through S5 will produce roughly equal swings of the milliammeter needle. As will be understood by inspection of the circuit of FIG. 8, the indicator I operates by adding the resistances R11 through R15 in parallel, as the switches S1 through S5 are closed, thereby to decrease the net resistance in series with the milliammeter M and to increase current through it. Because only very low voltages and currents are permitted to pass into the tank T there is reduced danger in hazardous or explosive environments. The maximum potential drop within the detecting means D is the voltage across terminals As, Cs, and since the current is limited by R7 and R8 to 300 Ma., the total available energy is below that which can cause fire or explosion in any hazardous environment.

As a means for verifying the integrity of conductors C1 through C5, FIG. 8 shows the use of shunt resistors R1 through R5 connected across each of the switches S1 through S5. By using an ohmmeter at the location of the indicator I, it is possible to know whether the conductors have been opened circuited: if the conduuctors are broken, the ohmmeter will indicate an infinite resistance, but if the conductors are whole, the ohmmeter will indicate the shunt resistance. When the switches S1 through S5 are closed, the shunt resistances are shorted out and have no effect. An economic advantage can be achieved by substituting an ohmmeter, suitably marked, for the milliammeter M. Then, only two conductors to the sensors are required instead of the six shown in FIG. 8. Also proper selection of resistors R1 to R5 will eliminate resistors R11 to R15. FIG. 9 corresponds to the righthand side of FIG. 8 and illustrates a second, simpler arrangement with indicating means IL comprising light bulbs L1 through L5 in conductors C1 through C5, connected to a transformer power supply P which supplies the conductor C10. A visual indication of level is given by the lighting of each of the lamps L1 through L5 as the corresponding switches S1 through S5 are closed.

FIG. 10 illustrates yet another level indicating system utilizing pressure switches according to the invention. This system is particularly suited for use in a hazardous environment (within boundary line B) and is equipped with a high alarm 50 and a low alarm 52 for indicating overfilling and emptying of the tank, respectively. Use of one or both of the alarms provides warning of an undesirable condition and enables remedial measures to be taken.

The system according to FIG. 10 is disclosed more in detail in my copending application Ser. No. 865,457 filed Oct. 10, 1969, and will be described herein only so far as relevant for purposes of the present invention.

The circuit according to FIG. 10 is supplied through terminals A, C from a source of 110 to 220 volt alternating current. It includes a switch SW1, tandem fuses F1 and F2, and a shunting neon or glow tube G1 for limiting the maximum current and voltage applied to the input terminals of a potted module 12.1 which is identical with module 12 of FIG. 1. The module 12.1 steps down the voltage to a value conforming to safety regulations and applies it to output terminals As, Cs across which are connected two opposed Zener diodes Z1 and Z2 functioning as a bidirectional voltage limiter to cancel transient voltage surges. The stepped down voltage across terminals As, Cs, forms a separate series circuit with each of the switches S1 to S5 through associated potentiometers R21 to R25, respectively. These potentiometers have intermediate taps connected through resistors R31 through R35 respectively to a common input terminal of a full wave rectifier 54, the other input terminal of which leads to terminal Cs. The full wave rectifier 54, preferably a diode bridge, drives a DC milliammeter M2 through resistor R16. As in the circuit of FIG. 8, the closure of switches S1 through S5 changes the total resistance of the parallel branch resistance network which controls the current through the indicating milliammeter M2. Analogous to FIG. 8, the potentiometers R21 to R25 are tapped such that the closing of successive switches S1 through S5 produces roughly equal swings of the milliammeter needle.

The high alarm 50 and the low alarm 52 are controlled by the topmost switch S5 and the bottommost switch S1 respectively. Similar alarms might be used at intermediate levels if such are of critical importance. As connected in FIG. 10, the high alarm 50 gives a warning when the fluent material F rises enough to close switch S5, and low alarm 52 gives a warning when the fluent material descends low enough to open switch S1.

Upon closing, switch S5 places the stepped down voltage across terminal A2, C2 at the input of potted module 12.2 (identical with module 12 of FIG. 8) which steps up the voltage to drive a relay RY1 after rectification by a full wave rectifier 56. The relay RY1 has normally open contacts RS1 as shown, forming a series circuit with the high alarm 50. When the switch S5 closes, the relay contacts close to operate the alarm. In similar fashion, the closing of switch S1 places the stepped down voltage at terminals A3, C3 across the input of module 12.3 (identical with module 12 of FIG. 8) which steps up the voltage to drive a relay RY2 after rectification by a full wave rectifier 58. The de-energized relay RY2 has closed contacts RS2, as shown, forming a series circuit with the low alarm 52. When switch R52 opens, the relay RY2 de-energizes and the contacts of relay RY2 close and operate the low alarm 52.

The above described elements have their connections clearly shown in FIG. 10. For a more complete disclosure of the elements, their exact structural characteristics or dimensions or ratings so far as material for the proper operation of the device are identified in the following list which refers to the numerals of FIG. 10, it being understood that adjustments and mutual correlations may have to be applied upon initial testing for proper performance, according to routine practice in manufacture of devices of this type. Further aspects of the circuit of FIG. 10 appear in my above-identified copending application.

R21–R25—1K ohms
R31–R35—470 ohms
R16—470 ohms
Z1, Z2—Type 1N1734 (5.6 volts)
RY1, RY2—"Life Instrument Co.," 2500 ohm coil, DC, 2C (DPDT) RGP
M2—"Simpson" DC milliammeter model 1329 No. 6490, 0–5 milliammeters range
Rectifiers 54, 56, 58—Diode bridge composed of 4 diodes of type Motorola molded rectifier bridge No. MDA 942-2

Figure 11:
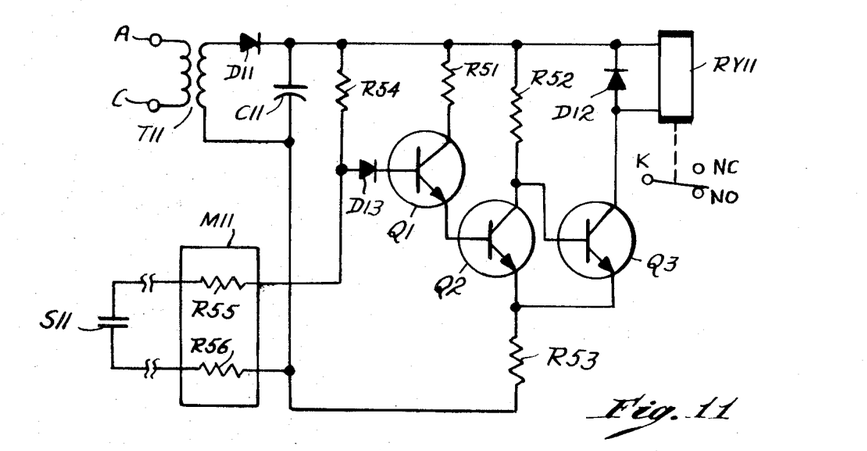

FIG. 11 illustrates yet another indicating system for use with pressure switches according to the invention. This system provides protection in a hazardous environment and moreover enables alarms, indicators or controls to be actuated by any individual switch, not just the highest or lowest as in FIG. 10. The system according to FIG. 11 connects a circuit I11 to each pressure actuated switch S11 through appropriate conductors. Only one circuit I11 and switch S11 are illustrated for simplicity, but it will be understood that two or more of each will typically be used in a system. As illustrated, the circuit I11 has terminals A, C for connection to a source of 115 volt alternating current, a stepdown transformer T11 for reduction of the 115 volt source to 6 volts, and a diode D11 and capacitor C11 in series with the transformer secondary to provide a rectified 6 volt DC supply across capacitor C11. This 6 volt source supplies power to a transistor switch St and to a relay RY11 governed thereby. The relay RY11 has contacts NC, NO, and K for connection to indicator lights, alarms, or control devices, for whatever indication or response is deemed appropriate to the switch closing or opening. The transistor switch St, as shown, comprises transistor Q1 with collector resistor R51, transistor Q2 with collector resistor R52 and emitter resistor R53, and transistor Q3 with the relay RY11 shunted by diode D12 in its collector circuit and with the resistor R53 in its emitter circuit. The transistors are connected so that the emitter of Q1 is connected to the base of Q2 to act as input thereof, and the collector-emitter output of the Q2 is across the base-emitter input of Q3. With this connection when Q1 is turned off (not conducting), Q2 is also off, Q3 is on (conducting), and relay RY11 is energized by collector current in Q3. Conversely with Q1 on, Q2 is on, Q3 is off, and relay RY11 is deenergized.

Control of conduction in Q1, and consequent control of relay RY11, is accomplished by varying the input voltage through diode D13 at the base of Q1 by means of pressure switch S11. The base voltage of Q1 is determined by a voltage divider having a very large resistor R54 in the upper leg, and in the lower leg the switch S11 connected through two isolating resistors R55 and R56 which are small compared to R54. When pressure switch S11 is closed, the small resistance of R55 and R56 compared to R54 compels the base voltage of Q1 to be very low, and Q1 will not conduct; when switch S11 is opened, the base voltage is high and Q1 conducts.

In the event the switch S11 is to be placed in a hazardous area, the isolating resistors R55 and R56 are of the wirewound type with axial leads, and are encased in potting material to form a module M11, as shown, which prevents the transmission of hazardous power levels to the switch S11 whatever may happen in indicator circuit I11.

For a more complete disclosure of the circuit elements whose connections are shown in FIG. 11, the following list identifies structural characteristics, ratings, or dimensions so far as material for proper operation of the device, it being understood that routine adjustments and correlations from nominal values may be found necessary for proper performance:

R51—330K ohms
R52—3.3K ohms
R53—1.0 ohms
R54—1 megohm
R55, R56—6K ohms, 5 watts
D11—Type M300
D12, D13—Type 1N914
C11—500 mfd.
Q1, Q2, Q3—Type 2N3415
RY11—DPDT relay, 40 ohm coil From the foregoing description, the following advantages, among others, of pressure switches according to the invention will now be evident.

Possible swaging, flexing, or bending of an assembly such as in D (FIG. 8), will not impair the functioning of the device, for the reasons pointed out above with reference to FIGS. 4 and 4a.

Since the flexible contact strip 18 is at all times held apart from the supporting strip 10 at two points 20 and 22, any tendency to stick and hence misfunction is prevented.

As the applied pressure increases, the contact area as well as the contact pressure increase also, and this feature contributes to safe operation.

The contact side 16 of the flexible strip 18 provides a rolling contact with contact 14 thereby greatly minimizing contact wear. The free end of blade 18 is restrained from moving in but one direction, namely downwardly. As the external pressure increases, the contact rolls continually along while remaining in compression at continuously new areas.

The sensing switch can be actuated only by pressure normal thereto, at one predetermined value only, which permits accurate selection of the location, such as fluid level, at which the switch should respond.

Due to the inherent electrical and mechanical properties of the switch, ample signalling energy is available without amplification for operating a relay. Signal attenuation due to long distances between sensor and readout does not present a problem. The output signal has extremely low impedance thereby providing reliable response unaffected by the well-known impediments of high impedance sensors such as noise pick up and instability of amplified signals.

The readout can be accurately calibrated by moving the sensor or sensors predetermined amounts such as below selected levels to compensate for actuation depth sensitivity.

While pressure switches dimensioned as described above by way of example will operate very well for most liquid level detecting arrangements, it may be desirable for that purpose, and for other purposes to be explained below, to vary the operating characteristics. This can be done by adjusting various parameters, for example as follows.

If the thickness of the flexible contact blade is increased a predetermined amount, a proportionately increased pressure change will be required to close the contacts. If the thickness of the envelope E is changed, the actuating pressure will change accordingly. If the gap separating the two contacts is changed, the actuating characteristics will change accordingly. Biasing by preflexing the blades in the direction opposite to the pressure effect, or tempering them will also effect proportionate changes in the pressure required for closing the contacts. It will be evident that exact theoretical predetermination of the adjustments required for a desired pressure response cannot be expected and that some experimentation is necessary for that purpose; however once a satisfactory parameter choice has been established, the corresponding desired switch response will be fairly permanent.

Figure 12:
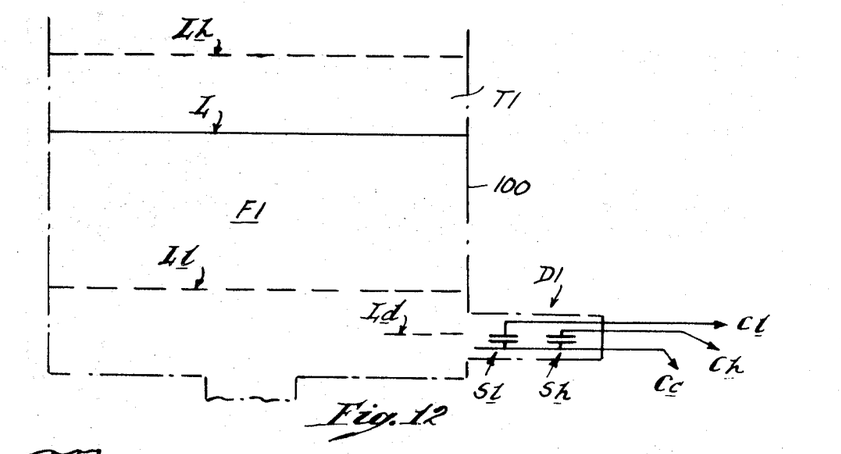
FIG. 12 is a schematic view of another embodiment of level detecting means according to the invention.
Figure 13:
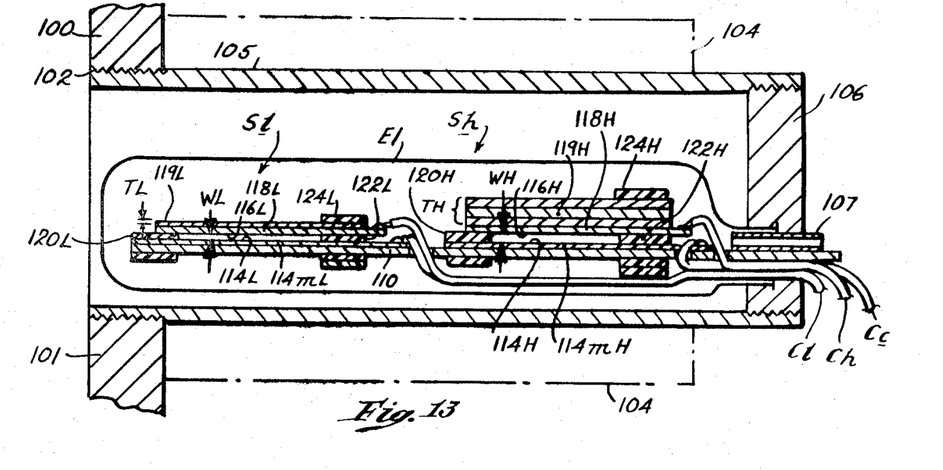
FIG. 13 is a sectional view showing details of the level detecting means of FIG. 12.

FIGS. 12 and 13 illustrate a highly practical level detecting system in which pressure switches according to the invention have their operating characteristics adjusted so that switch actuation will take place at different pressures. In many water-level detecting applications it is necessary to physically protect the pressure sensors from ice forming in the tank and breaking up with great destructive force as levels change. The hanging sensor strip described above with reference to FIGS. 1–7 could be inserted into a protective device such as a pipe extending vertically in the tank, but where the tank is deep, installation and support problems are encountered, and the cost of ice protection is high. One alternative would be to mount separate switches in short protective devices each fastened to the tank at a different height, but here problems are encountered in both mounting the devices and in making electrical connections between the switches and an indicating device such as is shown in FIGS. 8–11.

The preferred solution to the problem of protecting a pressure sensor from destruction from the contents of the tank whose level is desired to be measured is illustrated in FIG. 12, which shows a tank T1 containing a fluent material or fluid F1 at level L within walls 100. The fluid F1 is of the type having a regular pressure variation with height, such as water. For simplicity it will be assumed that only a high level L$h$ and a low level L$l$ of the fluid F1 are to be detected, although it will become apparent that any number of different fluid levels can be detected in the same manner. A pressure detector D1 is secured to the tank wall at a level L$d$ which is beneath the levels L$h$ and L$l$ to be detected (FIG. 12). The pressure detector D1 comprises a plurality of pressure switches S$h$ and S$l$ of the type according to the invention and as described above with respect to FIGS. 1–7, one switch being furnished for each level L$h$ and L$l$ respectively to be detected, and located substantially at the common level L$d$. Each of the pressure switches has its pressure responsive parameters adjusted so that it will close at a pressure which corresponds to the level that the switch is to detect; for example, switch S$h$ is adjusted so that it will respond to a pressure which corresponds to the height of fluid F1 between levels L$h$ and L$d$, and switch S$l$ is adjusted so that it will respond to a pressure which corresponds to the height of fluid F1 between levels L$l$ and L$d$. The appropriate pressure for a particular height of fluid depends, of course, on the specific gravity of the fluid and its compressibility: water produces a pressure of 0.433 p.s.i. for each foot its level is above the detecting switch. As shown in FIG. 12, the pressure switches S$h$ and S$l$ have connected thereto conductors C$h$ and C$l$, respectively, and a common conductor C$c$, which are suitable for attachment to an indicating device such as is shown in FIGS. 8–11.

Pressure switches according to the present invention, having large contact areas, narrow contact gaps, and a sliding support for the movable contact, are particularly well adapted for use in a detector D1 which situates a low pressure detecting switch S$l$ at a level L$d$ subject to high pressures generated by fluid at level L$h$. Increasing pressures on these switches above their actuating pressures is not harmful, because destructive forces do not develop: the envelope E is collapsed upon itself so that only compressive forces, not tearing forces, act upon it; the flexible strip is already pushed against the supporting strip, and opportunities for destructive bending of the strip are limited by the narrow gap; the sliding contact prevents high tensional forces on mounts. Thus the low pressure switch S$l$ will maintain accurate pressure responsive characteristics despite subjection to high pressures.

FIG. 13 illustrates details of a practical embodiment of the pressure detector D1 illustrated schematically in FIG. 12. The pressure detector comprises a threaded pipe conduit 105 fitting within a threaded hole 102 provided in wall 100, which is either the tank wall or the wall of a standpipe or other container communicating with the tank. Heating means 104 can be provided around pipe 105 to prevent ice formation. The pipe 105 is open to communicate with the interior of the tank and to fill with the tank contents, but it does not extend or protrude beyond the inner surface 101 of wall 100 and is thus free of falling ice or debris. Mounted within pipe 105 are switches S$h$ and S$l$, the switches having a common supporting strip 110 which is secured in an end plug member 106 threaded internally into the outer end of pipe 105. Conductors C$h$ and C$l$, associated with switches S$h$ and S$l$ respectively, lead through end plug 106 to an indicating means (not shown), along with common conductor C$c$. Fitting over switches S$h$ and S$l$, over conductors C$h$ and C$l$, and over supporting strip 110 is a pliable envelope E1 (similar to envelope E described above) which extends to plug 106 where a water-tight connection is made. Air pressure within the envelope E1 is equalized with the air pressure outside the tank T1 by means of a vent pipe 107 which extends from within envelope E1 through plug 106 to the atmosphere outside the tank. Thus as fluid pressure on envelope E1 builds up, it will be transmitted accurately to the switches S$h$ and S$l$ without counteraction by air pressure within the envelope; similarly, as fluid pressure on the envelope decreases, switches S$h$ and S$l$ are permitted to open without hindrance resulting from a vacuum effect which would occur if air were prevented from entering the envelope.

As indicated previously, the switches S$h$ and S$l$ have their pressure-responsive parameters adjusted to cause switch closing to take place at pressures corresponding to the different levels L$h$ and L$l$. FIG. 13 indicates one manner in which the switches can be constructed so as to obtain the desired pressure responsive characteristics from standardized parts and components. As shown, switch S$l$ (similar to the switch shown in FIGS. 5 and 6), responding at the lower pressure produced by lower level L$l$, has a contact strip 114$m$L on supporting strip 110 and a flexible strip 118L spaced at both ends from the contact strip by spacing means 120L and 122L (such as tape) producing a gap of width WL between fixed contact 114L on contact strip 114$m$L and movable contact 116L on flexible strip 118L. One end of flexible strip 118L is secured by means 124L and the other end is free to move, as described before. Secured adjacent the flexible strip 118L by means 124L is an additional leaf spring or stiffening strip 119L, of thickness TL, which imparts additional rigidity to the movable portion of the switch and thus by reducing its resilience increases the actuating pressure at which the switch closes to the precise pressure desired. It is a simple matter to provide as basic switch components the supporting strip 110 with contact strip 114$m$L and flexible strip 118L with movable contact 116L, and to obtain higher actuating pressures by varying gap width WL (as by increasing the number of layers of tape) and by providing a selection of spring strips 119L of the same general dimensions and materials as flexible strip 118L, but in thicknesses TL which will provide a range of actuating pressures.

As illustrated by the construction of switch S$h$, responding at the higher pressure produced by higher level L$h$, a spring strip means can be provided by stacking a number of separate strips. Switch S$h$ has contact strip 114$m$H and flexible strip 118H spaced with gap WH between fixed contact 114H and movable contact 116H by means 120H and 122H (such as pressure-sensitive tape). Means 124H secure both one end of flexible strip 118H and one end of an adjacent stiffening strip 119H, which comprises a plurality of separate strips having a composite thickness TH. By experimentation it can be determined how much one strip of a given thickness elevates the actuating pressure, and the desired actuating pressure can be obtained by choosing the appropriate number of strips to obtain the desired thickness.

It will now be evident that the system according to the invention has applications beyond those specifically described above. Such applications are in fields including flow, velocity and pressure detection. Also included are marine uses, such as indication of ship's draft, ballast and fluid cargo level. Further included are drought and flood control where measurement and recording of water table variations are required. In certain applications, the system according to the invention replaces less simple and reliable devices such as float controlled switches for actuating pumps in bodies of water such as sumps, wells, reservoirs, rivers, lakes, and oceans.

While the above-described embodiments respond to a pressure change corresponding to a predetermined interface location to be detected, pressure responsive switches according to the invention can also be utilized for supervising continuous pressure variations by responding to a predetermined singular value within a range of continuous pressure fluctuation. For example, a switch which is calibrated for response to a predetermined pressure, or a series of switches calibrated to a scale of different pressures, can be placed into a closed pressure tank. Such arrangements serve to indicate undesirably high or low pressures, or for continuous pressure supervision. It will be evident that a series of switches calibrated in this manner can be assembled on a single supporting structure in the manner described with reference to FIGS. 1–4 or 12–13, or mounted as separate units. The indicating and evaluating instrumentalities are analogous to those described above, with reference to FIGS. 8, 9, 10 and 11, as applied to fluid level supervision.

For generalized pressure detecting in pressurized containers with switch assemblies according to the invention, for example to detect pressure of compressed air in a tank, the pressure within the envelope or jacket E can be equalized with the external pressure, such as by means of a flexible breathing tube similar to tube 107 of FIG. 12 extending from the upper end of the assembly, or a suitably vented pressure tight junction box for terminating and supporting the hanging sensor strip assembly.

For level detecting in pressurized containers with switch assemblies according to the invention, for example to detect level of a liquid kept pressurized because of high vapor pressure, the pressure within the envelope or jacket E can be equalized with the internal pressure, such as by means of a flexible breathing tube similar to tube 107 of FIG. 12 extending from the upper end of the assembly and terminating at top of container but venting within the pressurized container. A suitably vented pressure tight junction box for terminating and supporting the hanging sensor strip assembly, but vented into the pressurized container, may also be utilized.

It should be understood that the present disclosure is for the purpose of illustration only and that this invention includes all modifications and equivalents which fall within the scope of the appended claims.

I claim:
1. A pressure actuated switch comprising:
   a supporting strip having fixed electrical contact means;
   a flexible strip having movable electrical contact means;
   means for spacing portions of the flexible strip, on either side of said movable contact means, from the supporting strip; and
   means for fixedly securing one of said portions relatively to the supporting strip, the other portion being free to slide on said spacing means;
   whereby the movable contact means will approach and touch the fixed contact means upon bending of the flexible strip by pressure applied thereto.

2. A switch according to claim 1 further comprising a pliable envelope surrounding said strips:
whereby the switch when immersed in fluent material will respond to pressure transmitted through said envelope to said flexible strip to close said contacts.

3. A switch according to claim 1 wherein said supporting strip is conductive and said fixed contact means is constituted by a surface of the supporting strip.

4. A switch according to claim 1 wherein said fixed contact means comprises a sheet of conductive material secured to said supporting strip.

5. A switch according to claim 4 wherein said supporting strip is conductive and said fixed contact means is electrically connected thereto.

6. A switch according to claim 1 further comprising a stiffening strip secured to said supporting strip in the region of said flexible strip.

7. A switch according to claim 6 wherein said stiffening strip is secured to said supporting strip on the side opposite said flexible strip.

8. A switch according to claim 6 wherein said stiffening strip is secured to said supporting strip on the side adjacent said flexible strip, between the fixed contact means and the supporting strip.

9. A switch according to claim 1 wherein said spacing means comprises wrappings of pressure sensitive adhesive tape secured to said supporting strip.

10. A switch according to claim 1 wherein said securing means comprises wrappings of pressure sensitive adhesive tape encircling said supporting and flexible strips.

11. A switch according to claim 1 further comprising stiffening strip means secured adjacent said flexible strip, whereby the pressure necessary to bend said flexible strip is increased.

12. A switch according to claim 11 wherein said stiffening strip means comprises at least one strip above said flexible strip, and wherein the means securing said flexible strip also secures said added strip.

13. Sensor means for detecting a level of fluent material comprising:
a supporting strip extending through said fluent material traversely to said level;
a plurality of pressure actuated switch means distributed along said supporting strip at predetermined levels, each switch means having a pair of contacts of conductive material for producing a short circuit therethrough when the contacts are closed;
pliable envelope means for transmitting the pressure of said fluent material to said switch means for response to the pressure;
a plurality of conductive means associated with respective switches and forming circuits through the contacts thereof;
means connected to said conductive means for indicating the pressure responsive, closed or open, condition of the switches; and
a plurality of resistance means each connected across respective ones of said switches, for checking the integrity of said conductive means.

14. Sensor means for detecting a level of fluent material comprising:
a supporting strip extending through said fluent material traversely to said level;
a plurality of pressure actuated switch means distributed along said supporting strip at predetermined levels, each switch means having a pair of contacts of conductive material for producing a short circuit therethrough when the contacts are closed;
pliable envelope means for transmitting the pressure of said fluent material to said switch means for response to the pressure;
a plurality of conductive means associated with respective switches and forming circuits through the contacts thereof;
means connected to said conductive means for indicating the pressure responsive, closed or open, condition of the switches; and
said indicating means comprising a source of electrical power; and
a plurality of indicator lights each connected by said conductive means in series with a respective one of said switches and with said power source.

15. Sensor means for detecting a level of fluent material comprising:
a supporting strip extending through said fluent material traversely to said level;
a plurality of pressure actuated switch means distributed along said supporting strip at predetermined levels, each switch means having a pair of contacts of conductive material for producing a short circuit therethrough when the contacts are closed;
pliable envelope means for transmitting the pressure of said fluent material to said switch means for response to the pressure;
a plurality of conductive means associated with respective switches and forming circuits through the contacts thereof;
means connected to said conductive means for indicating the pressure responsive, closed or open, condition of the switches; and
said indicating means comprising a voltage source;
a current meter connected in series with said voltage source; and
a plurality of resistances each connected by said conductive means in series with said voltage source and with one of said switches, said resistance being added in parallel by closure of respective switches to vary current through said meter.

16. Sensor means according to claim 15 wherein the values of said resistances are selected for substantially equal changes in current in said meter upon closure of successive switches.

17. Sensor means for detecting a level of fluent material comprising:
a supporting strip extending through said fluent material traversely to said level;
a plurality of pressure actuated switch means distributed along said supporting strip at predetermined levels, each switch means having a pair of contacts of conductive material for producing a short circuit therethrough when the contacts are closed;
pliable envelope means for transmitting the pressure of said fluent material to said switch means for response to the pressure;
a plurality of conductive means associated with respective switches and forming circuits through the contacts thereof;
means connected to said conductive means for indicating the pressure responsive, closed or open, condition of the switches; and
each of said pressure actuated switch means including a fixed contact carried by said supporting strip;
a flexible strip carrying a movable contact;
means for spacing the ends of the flexible strip from the supporting strip with said contacts opposite each other; and
means for fixedly securing said flexible strip at one end, the other end being free to slide against said spacing means.

18. Sensor means according to claim 17 wherein said pliable envelope surrounds the switch means, the pressure of said fluent material being transmitted through said envelope to said flexible strip to close said contacts.

19. Sensor means for detecting a level of fluent material comprising:
a supporting strip extending through said fluent material traversely to said level;
a plurality of pressure actuated switch means distributed along said supporting strip at predetermined levels, each switch means having a pair of contacts of conductive material for producing a short circuit therethrough when the contacts are closed;

pliable envelope means for transmitting the pressure of said fluent material to said switch means for response to the pressure;

a plurality of conductive means associated with respective switches and forming circuits through the contacts thereof;

means connected to said conductive means for indicating the pressure responsive, closed or open, condition of the switches; and said indicating means comprising alarm means controlled by said switch means for indicating the passage of fluent material through a predetermined level.

20. Sensor means according to claim 19 wherein said alarm means comprises:

a first alarm controlled by the switch means highest on said supporting strip for operation by closure of said highest switch;

a second alarm controlled by the switch lowest on said supporting strip for operation by opening of said lowest switch.

21. A sensor system for detecting pressure of fluent material comprising:

a container for said material having varying pressures;

within said container switch means responsive instantly, from fully open to fully closed position, to increase of pressure to a selected value, said switch means comprising a supporting strip having fixed electrical contact means, a flexible strip having movable electrical contact means, means for spacing portions of the flexible strip on either side of said movable contact means, from the supporting strip, and means for fixedly securing one of said portions relatively to the supporting strip, the other portion being free to slide on said spacing means;

means for transmitting pressure of said material to said switch means;

conductor means associated with said switch means; and electrical indicating means connected to said switch means for response to closing thereof indicative of pressure of the fluent material.

22. System according to claim 21 further comprising second switch means within said container and responsive instantly, from fully open to fully closed position, to increase of pressure to a selected value different from the selected pressure value at which said first switch means responds.

23. System according to claim 21 wherein said switch means is placed within said container at a level corresponding to a predetermined pressure of fluent material, closing of the switch means indicating said level in terms of said pressure.

24. System according to claim 23 further comprising second switch means placed within said container substantially at the level of the first switch means, said second switch means being responsive to increase of pressure to a second selected value, different from the first switch means selected value, and corresponding to a different level of fluent material, closing of the second switch means indicating said different level in terms of said different pressure.

25. Sensor means for detecting levels of fluent material comprising:

a plurality of pressure actuated switch means disposed substantially at a common level on the fluent material beneath the levels to be detected;

each of said switch means responding to a predetermined pressure corresponding to one of the levels to be detected;

pliable envelope means over each said switch means for transmitting the pressure of said fluent material to each said switch means for response to the pressure;

a plurality of conducting means associated with respective switches and forming circuits therewith;

means connected to said conductive means for indicating the pressure responsive, closed or open, condition of the switches; and each of said pressure actuated switch means including supporting strip means having a fixed contact;

flexible strip means having a movable contact;

means for spacing the ends of the flexible strip means from the supporting strip means with said contacts opposite each other; and means for fixedly securing said flexible strip means at one end, the other end being free to slide against said spacing means; and wherein the flexible strip means of each pressure actuated switch means has a flexibility related to the gap between fixed end movable contacts cause the switch means to close at the predetermined pressure corresponding to the level that that switch is to detect.

26. Sensor means according to claim 25 wherein the flexible strip means of respective switch means have different thicknesses and therefore different flexibilities.

27. Sensor means according to claim 26 wherein at least one of the flexible strip means of the respective switch means comprises:

a flexible strip carrying the movable contact; and a stiffening strip secured adjacent the flexible strip by said securing means.

28. A sensor system for detecting first and second levels of fluent material located in a container, comprising:

tubular mounting means open at one end to communicate with the container at a third level below said first and second levels;

a supporting strip having first and second fixed contacts within the tubular mounting means;

first flexible strip means having a movable contact facing said first fixed contact, and with portions on either side of the movable contact being spaced from said supporting strip, one of said portions being secured relatively to the supporting strip, the other being free to slide;

second flexible strip means having a movable contact facing said second fixed contact, with portions on either side of the movable contact being spaced from said supporting strip, one of said portions being secured relatively to the supporting strip, the other portion being free to slide;

a pliable envelope surrounding said supporting and each flexible strip means, said envelope interior communicating with the exterior of the container, whereby pressure in said pliable envelope will be equalized with pressure at the exterior of the container and whereby the pressure of said fluent material will be transmitted through said envelope to said first and second flexible strip means;

said first flexible strip means having its flexibility related to the gap between said first movable and fixed contacts such that they close at the pressure corresponding to the difference in height of the fluent material between said first and third levels;

said second flexible strip means having a flexibility related to the gap between said second fixed and movable contacts such that they close at the pressure corresponding to the difference in height of fluent material between said second and third levels;

conductive means associated with said first and second fixed and movable contacts and leading to the exterior of said tank;

means connected to the conductive means for indicating the pressure responsive, opened or closed, condition of the respective contacts.

(References on following page)

References Cited

UNITED STATES PATENTS

| | | | |
|---|---|---|---|
| 1,281,013 | 10/1918 | Humphreys | 13—301 |
| 1,285,145 | 11/1918 | Harrington | 73—301 |
| 2,547,526 | 4/1951 | Hilliard | 340—244 |
| 2,713,793 | 7/1955 | Andersen | 73—301 |
| 3,153,342 | 10/1964 | Pierce | 73—301 |
| 3,335,242 | 8/1967 | Johnson | 200—83 |
| 752,158 | 7/1933 | France | 73—301 |
| 825,007 | 11/1937 | France | 73—301 |

LOUIS R. PRINCE, Primary Examiner

D. E. CORR, Assistant Examiner

U.S. Cl. X.R.

200—61.2

PO-1050
(5/69)

UNITED STATES PATENT OFFICE
CERTIFICATE OF CORRECTION

Patent No. 3,623,366　　　　　　　　Dated　November 30, 1971

Inventor(s)　William G. Rowell

It is certified that error appears in the above-identified patent and that said Letters Patent are hereby corrected as shown below:

Column 1, lines 4 and 5, the identification of the

Assignee should be changed to read:

--assignor to Farmer Electric Products Co., Inc.--

Signed and sealed this 30th day of May 1972.

(SEAL)
Attest:

EDWARD M.FLETCHER,JR.　　　　　　ROBERT GOTTSCHALK
Attesting Officer　　　　　　　　　Commissioner of Patents